United States Patent [19]

Robinson

[11] 4,060,921
[45] Dec. 6, 1977

[54] ANIMAL EAR TAG

[76] Inventor: Owen R. Robinson, Rte. 2, Douglass, Kans. 67039

[21] Appl. No.: 678,130

[22] Filed: Apr. 19, 1976

[51] Int. Cl.$^2$ ................................................. G09F 3/12
[52] U.S. Cl. ........................................... 40/301; 40/22
[58] Field of Search ................. 40/301, 302, 300, 305, 40/22, 20 A, 21 R, 25 R, 134

[56] References Cited

U.S. PATENT DOCUMENTS

| | | | |
|---|---|---|---|
| 2,325,906 | 8/1943 | Claffey | 40/302 |
| 3,334,434 | 8/1967 | Melin | 40/301 |
| 3,675,357 | 7/1972 | Magee | 40/300 |
| 3,731,414 | 5/1973 | Murphy et al. | 40/301 |
| 3,738,299 | 6/1973 | Packler et al. | 40/134 |

Primary Examiner—John F. Pitrelli
Attorney, Agent, or Firm—Edwin H. Crabtree; John H. Widdowson

[57] ABSTRACT

An animal identification ear tag made of a flexible illuminous material for distinguishing the animal both during the day and at night. The tag is constructed of a first ear piece member and a second ear piece member. Both of the ear piece members are used for receiving an indicia marking thereon so that the marking on the tag can be seen from both the front and at the rear of the animal.

4 Claims, 12 Drawing Figures

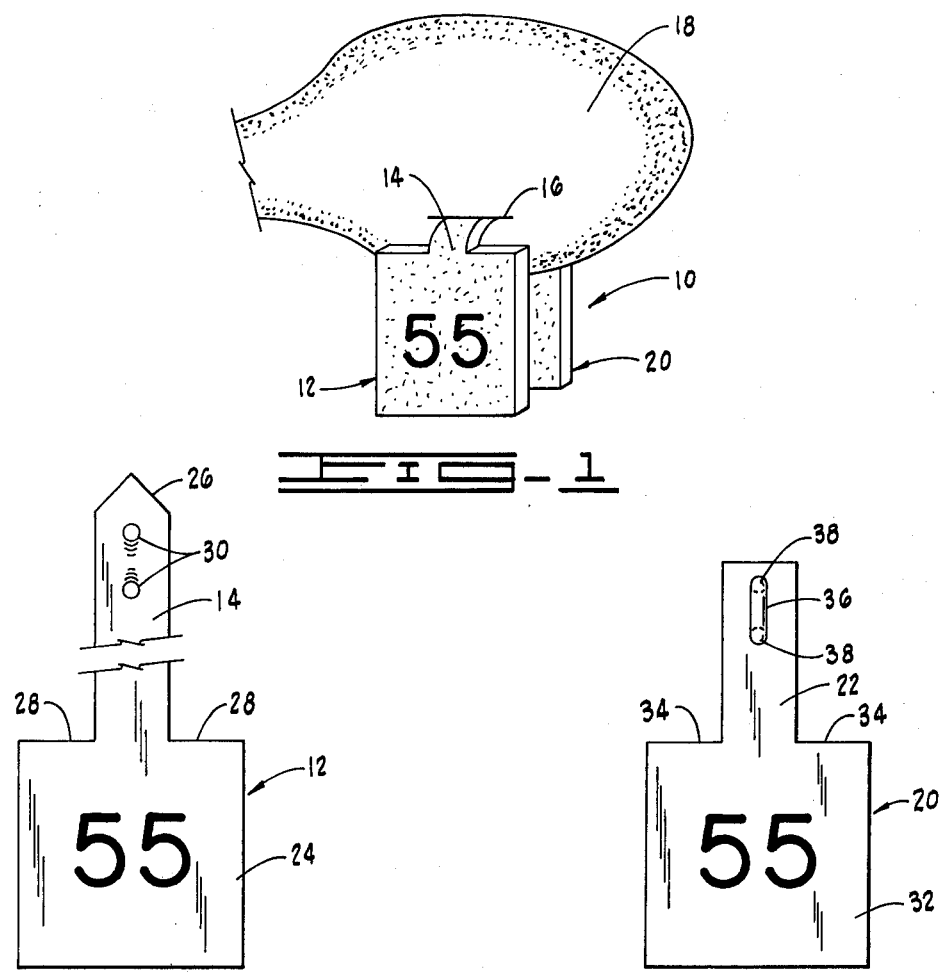
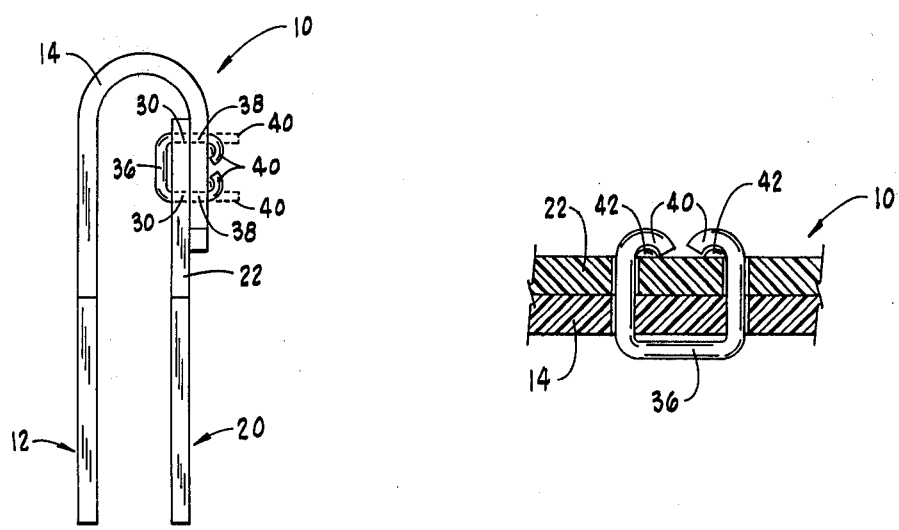

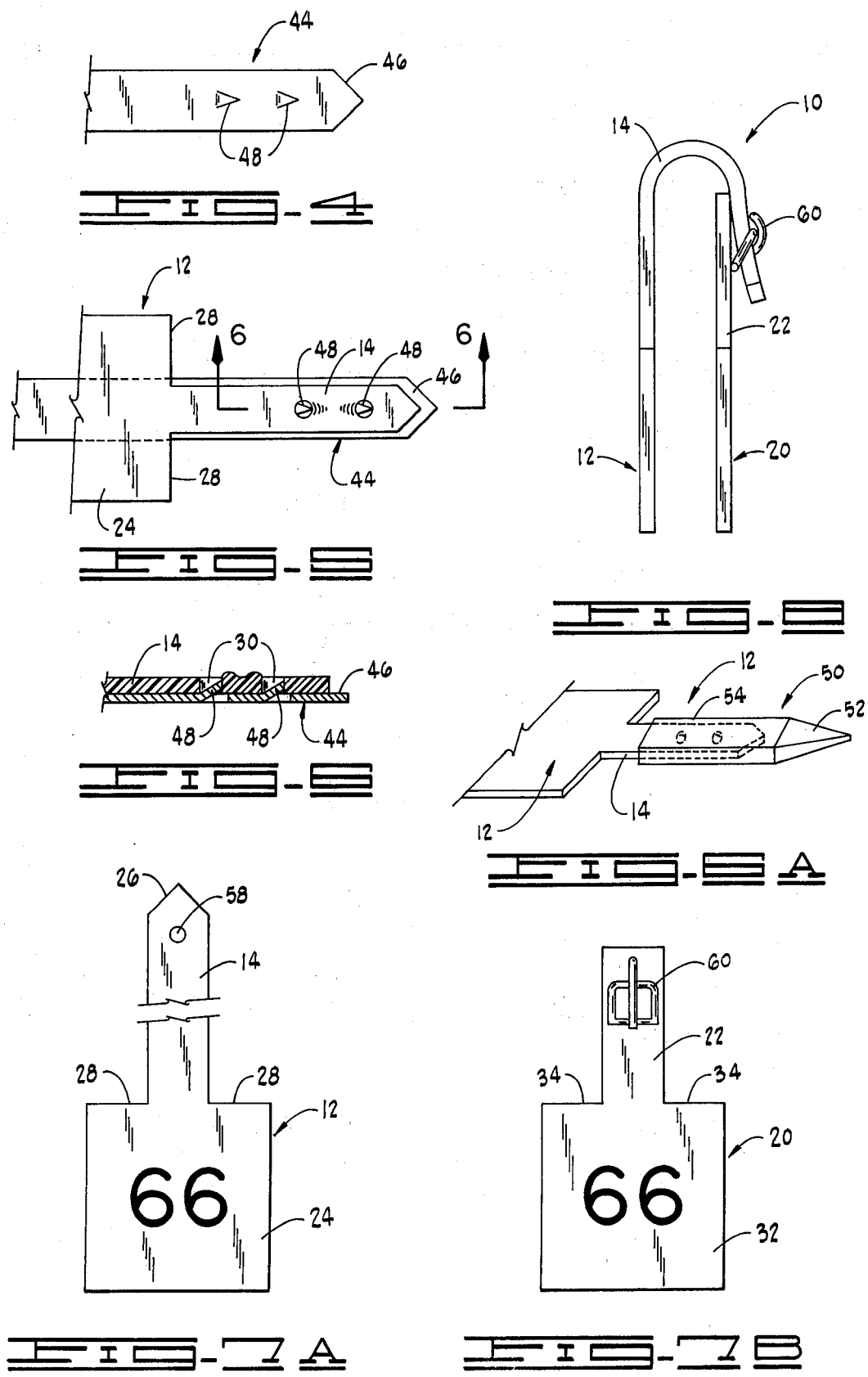

ANIMAL EAR TAG

BACKGROUND OF THE INVENTION

This invention relates generally to ear tags and more particularly, but not by way of limitation, to an animal ear tag for identification of the animal.

Heretofore there have been various types of metal ear tags having prongs extending therefrom for inserting through the animal's ear or wrapping around an edge of the animal's ear. These tags are difficult to see and are easily rubbed off by the animal.

Recently there has been introduced a one piece animal ear tag having a rigid pointed prong extending from the tag which is inserted through the animal's ear. The pointed prong often damages the tissue of the animal's ear and causes infection in the animal's ear. Also this type of tag is easily rubbed off by the animal.

More recently a one piece animal ear tag has been introduced having an arrow shaped end portion which is inserted through a slit in the animal's ear. The edges of the arrow portion are folded over as they are inserted through the slit. When the edges of the arrow portion are released the tag is held in place on the animal's ear. But, as the animal grows the slit in the ear increases in width thereby often allowing the arrow portion of the one piece ear tag to be removed from the slit in the animal's ear.

None of the prior art ear tags disclose the novel features of the two piece animal ear tag as described herein.

SUMMARY OF THE INVENTION

The subject invention includes a first ear piece member attached to a second ear piece member whereby both ear piece members include identification numbers thereon for reading the number of the animal from either the front or from the rear of the animal.

The first ear piece member and second ear piece member of the invention are made of a flexible illuminous material for sighting the animal at night should the animal be grazing along side a road and in danger of being hit by a vehicle.

The invention is simple in design and rugged in construction and is difficult if not impossible to be worn off or torn off by the animal. The invention can be easily attached to the animal by making a small slit in the animal's ear and inserting a pointed neck portion of the first ear piece member therethrough and attaching the end of the neck portion to a neck portion of the second ear piece member.

Also, because only a small slit is required in the animal's ear to receive the neck portion of the first ear piece member, no ear tissue is torn or damaged causing infection to the ear.

The first ear piece member and the second ear piece member are substantially larger than the slit in the animal's ear thereby preventing removal of the tag from the ear as the slit is enlarged due to the growth of the animal.

The first ear piece member can be quickly attached to the second ear piece member by the use of a U-shaped staple inserted through apertures in the first ear piece member and the second ear piece member. In the alternative a buckle can be used in place of the staple or any other attachment means.

The animal identification ear tag includes a flat angular shaped first ear piece member having an elongated neck portion integrally formed therein and extending outwardly therefrom. This neck portion is inserted through a slit in the animal's ear. A flat angular shaped second ear piece member which is substantially identical to the first ear piece member includes an elongated neck portion integrally formed therein and is attached to the end of the neck portion of the first ear piece member.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 illustrates the animal identification ear tag attached to the animal's ear.

FIG. 2A is a front view of the first ear piece member.

FIG. 2B is a front view of the second ear piece member.

FIG. 3A is a side view of the first ear piece member attached to the second ear piece member.

FIG. 3B is a sectional view of a U-shaped staple attached to a portion of the first ear piece member and the second ear piece member.

FIG. 4 illustrates a tool for inserting the first ear piece member through a slit in the animal's ear.

FIG. 5 is a top view of the tool shown in FIG. 4 attached to the neck portion of the first ear piece member.

FIG. 6 is a sectional view taken along lines 6—6 shown in FIG. 5.

FIG. 6A illustrates an alternate tool used for inserting the first ear piece member through the slit in the animal's ear.

FIG. 7A is a front view of the first ear piece member.

FIG. 7B is a front view of the second ear piece member having a buckle attached to the neck portion.

FIG. 8 is a side view of the first ear piece member attached to the second ear piece member using the buckle.

DETAILED DESCRIPTION OF THE DRAWINGS

In FIG. 1 the animal identification ear tag is designated by general reference numeral 10. The tag 10 includes a first ear piece member 12 having an elongated neck portion 14 integrally formed therein and extending outwardly therefrom through a slit 16 in an animal's ear 18. The end of the neck portion 14 is attached to a neck portion 22 of a second ear piece member 20. The neck portion 22 is shown in FIG. 2B.

In FIG. 2A the first ear piece member 12 is illustrated. The ear piece 12 is made of a flat, flexible, illuminous material for seeing the animal ear tag 10 at night. The ear piece member 12 includes an angular body portion 24 for receiving an indicia marking thereon and illustrated as numeral 55. The numeral on the tag 10 is used for identification purposes such as age, breeding, or family relationship as in a cow-calf program.

Extending from one side of the body portion 24 of the first ear piece 12 is the flat elongated neck portion 14 having a pointed end portion 26. The pointed end portion 26 is used for ease in inserting the neck portion 14 through the slit 16 in the animal's ear 18. Adjacent the neck portion 14 are shoulders 28 of the body portion 24.

The combined width of the shoulders 28 and the width of neck portion 26 are substantially greater than the width of the slit 16 in the animal's ear 18 thereby preventing the ear tag 10 from being removed from the animal's ear 18. The neck portion 14 further includes a pair of apertures 30 therein which are used for attaching to the neck portion 22 of the second ear piece 20.

In FIG. 2B the second ear piece member 20 is illustrated. The second ear piece member 20 is also made of a flat, flexible, illuminous material and includes an angular body portion 32 for receiving an indicia marking thereon which is the same number 55 as shown in FIG. 2A. The ear piece member 20 includes the elongated neck portion 22 and shoulder portions 34 adjacent thereto. The neck portion 22 includes a pair of apertures 38 therethrough for receiving ends 40 of a U-shaped staple 36.

While the first and second ear piece membrs 12 and 20 are made of an illuminous material, the members 12 and 20 can also be made of any type of flat, flexible material and the numeral 55 or any other numeral, letter, or design can be marked thereon with illuminous paint or the like for ease in identifying the animal both during the day and at night.

In FIG. 3A the first ear piece member 12 is attached to the second ear piece member 20 by inserting the staple 36 through the apertures 30 of the first ear piece member 12 and through the apertures 38 of the neck portion 14 of the first ear piece 12. The ends 40 of the staple 36 are shown in dotted lines prior to folding them over by a pair of pliers or any similar type tool thereby securing the first ear piece member 12 to the second ear piece member 20.

In FIG. 3B a sectional view of the neck portion 14 of the first ear piece member 12 and the neck portion 22 of the second ear piece member 20 are shown with the staple 36 securing the neck portions 14 and 22 together. In this sectional view the ends 40 of the staple 36 can be seen folded over raised portions 42 in neck portion 22 of the second ear piece member 20. The raised portions 42 are used in helping bend the end portions 40 over and securing the staple 36 to the neck portions 14 and 22.

In FIG. 4 a typical incision tool 44 is illustrated. The tool 44 has a sharpened pointed end portion 46 for making the slit 16 in the animal's ear 18. A pair of pointed portions 48 are stamped in the tool and extend outwardly therefrom.

In FIG. 5 the neck portion 14 of the first ear piece member 12 is illustrated mounted on the tool 44. It should be noted that the tool 44 has a width slightly larger than the width of the neck portion 14 so that the neck portion 14 can be inserted through the slit 16 made in the animal's ear 18 as the pointed portion 46 of the tool 44 is inserted therethrough. It should also be noted that the slit 16 made by the tool 44 is substantially less than the overall width of the body portion 24 of the first end piece member 12 and the overall width of the body portion 32 of the second end piece member 20 thereby preventing the tag 10 from being removed from the slit 16 in the animal's ear 18. The tool 44 guides the neck portion 14 through the slit 16 in the animal's ear 18 by the pointed portions 48 which are received in the apertures 30 and hold the neck portion 14 to the tool 44 as it is inserted through the slit 16.

In FIG. 6 a cross section of the tool 44 and the neck portion 14 is shown taken along lines 6—6 in FIG. 5. In this view the pointed portions 48 which extend outwardly from the tool 44 are seen received in the apertures 30 for holding the neck portion 14 to the tool 44.

In FIG. 6A an alternate tool 50 is shown having a pointed end portion 52 used for making the slit 16 in the animal's ear 18. The tool 50 includes a hollow end portion 54 for receiving the neck portion 14 therein. The neck portion 14 is inserted into the hollow end portions in a press fit and is held therein as the tool 50 makes the slit 16 in the animal's ear 18 and guides the neck portion 14 therethrough.

In FIG. 7A the first ear piece member 12 is illustrated having an alternate means for attaching the first ear piece member 12 to the second ear piece member 20. In this illustration the first ear piece member 12 is indicated by the numeral 66 marked on the body portion 24. The neck portion 14 includes a single aperture 58.

In FIG. 7B the second ear piece member 20 is illustrated having a numeral 66 marked on the body portion 32. The neck portion 22 includes a buckle 60 attached thereto.

In FIG. 8 the first ear piece member 12 is illustrated attached to the second ear piece member 20 by the neck portion 14 of the first ear piece member 12 inserted through the buckle 60 on the neck portion 22 and attached through the aperture 58 of the neck portion 14 thereby securing the first ear piece member 12 to the second ear piece member 20.

It should be recognized by those skilled in the art that while the use of the staple 36 and the buckle 60 are used for attaching the first ear piece member to the second ear piece member there are a number of different types of attachment means which may be used in securing the ear tag 10.

Changes may be made in the construction and arrangement of the parts or elements of the embodiments as disclosed herein without departing from the spirit or scope of the invention as defined in the following claims.

I claim:

1. An animal identification ear tag, the tag comprising:
   a flat angular shaped first ear piece member having an elongated neck portion integrally formed therein and extending outwardly therefrom, the neck portion of said first ear piece member inserted through a slit in the animal's ear;
   a flat angular shaped second ear piece member substantially identical to said first ear piece member, said second ear piece member having an elongated neck portion integrally formed therein and extending outwardly therefrom;
   a pair of apertures in the neck portion of said first ear piece member, said apertures in a spaced relationship to each other and along the length of the neck portion of said first ear piece;
   a pair of apertures in the neck portion of said second ear piece member, said apertures in a spaced relationship to each other and along the length of the neck portion of said second ear piece member, the apertures of said second ear piece member indexed with the apertures of said first ear piece member; and
   a "U" shaped staple, the ends of said staple inserted through the apertures of said first ear piece member and said second ear piece member and folded over thereby securing said first ear piece member to said second ear piece member, the neck portion of said second ear piece member includes a pair of raised portions adjacent the apertures in said second ear piece member, said raised portions are used in bending the end portions of said "U" shaped staple over in securing the staple to the neck portion of said second ear piece member.

2. The tag as described in claim 1, wherein the end of the neck portion of said first ear piece is pointed for ease inserting the neck portion of said first ear piece member through the slit in the animal's ear.

3. The tag as described in claim 1, wherein said first ear piece member and said second ear piece member are made of a flexible, illuminous material for distinguishing the animal both during the day and at night.

4. The tag as described in claim 1, further including illuminous identification markings on said first ear piece member and said second ear piece member for distinguishing the animal both during the day and at night.

* * * * *